Oct. 17, 1961 C. F. ALSING 3,004,393

THERMOELECTRIC HEAT PUMP

Filed April 15, 1960 2 Sheets-Sheet 1

INVENTOR
CARL F. ALSING
BY
ATTORNEY

INVENTOR
CARL F. ALSING
BY William J. Foley
ATTORNEY 3,004,393

THERMOELECTRIC HEAT PUMP

Carl F. Alsing, Wilbraham, Mass., assignor to Westinghouse Electric Corporation, East Pittsburgh, Pa., a corporation of Pennsylvania Filed Apr. 15, 1960, Ser. No. 22,444
9 Claims. (Cl. 62—3)

This invention relates to heat pumps, and particularly to apparatus which employ thermoelectric systems for transferring heat from a lower temperature medium to a higher temperature medium.

The invention is particularly applicable to heat pump apparatus employed in room or unit type air conditioning units, domestic refrigerators, and similar applications with moderate heat pumping requirements, but which require low-cost, easily assembled and efficient heat pump units.

Among the features in apparatus employing this invention are compactness of the heat pump unit and reliability, due to simplicity of construction.

A number of attempts have been made to apply the Peltier heat transfer phenomena to refrigerators, air conditioning units and similar mass-produced products. One serious deterrent to successful applications of this type has been the inability of thermoelectric materials to produce a temperature gradient as great as the gradient required by normal conditions under which these appliances must operate. For example, a room air conditioning unit must be capable of removing heat from room air at, say, 75 degrees F., and of dissipating this heat to outside air, which may be as high as 115 degrees F.; an ambient gradient of 40 degrees F. In actual practice, the heat absorbing portion of the unit must run at a temperature below inside air temperature, and the heat dissipating unit must run at a temperature higher than outside air temperature. Consequently, the air conditioning unit may be required to pump heat across a gradient of as much as 100 degrees F. Most known thermoelectric materials are not capable of producing a temperature gradient of this magnitude in a single stage system. It, therefore, becomes desirable to cascade or pyramid two or more thermoelectric systems in order to obtain the required temperature gradient between the heat absorbing unit and the heat dissipating unit.

This invention affords an improved structural arrangement providing for cascading of two or more thermoelectric systems, or arrays. Moreover, the invention enables the cascaded thermoelectric systems to be practically arranged and easily assembled.

In connection with this aspect of the invention, certain features and advantages are used from a prior invention of the applicant described and claimed in application Serial No. 733,426, entitled "Thermopile," filed May 6, 1958 and assigned to the same assignee as this invention. That invention relates to a stacked arrangement of thermoelectric elements and heat and electrical conductive junction members arranged about a central conduit and enclosed within a casing concentrically disposed with respect to the conduit. It was contemplated that the thermopile embodying this prior invention would transfer heat from the central conduit to the concentric casing, or vice versa, through a single stage thermoelectric system. In accordance with the present invention, which utilizes a similar stacked arrangement of the thermoelectric elements and junction members, heat is absorbed by one portion of the outer casing and dissipated by another portion of the same casing structure. The central portion of the thermopile comprises an elongated heat transfer member for transferring heat between two systems, or arrays, of thermoelectric elements disposed between the central heat transfer member and the concentric casing. One system of thermoelectric elements absorbs heat from one portion of the casing and transmits this heat to the central heat transfer member. The second system of thermoelectric elements withdraws this heat from the central heat transfer member and transmits it to another portion of the casing, from which it is dissipated to another medium.

A novel and unique electrical connecting arrangement enables the features and advantages of the stacking arrangement described and claimed in the aforementioned application to be utilized in the two-stage heat pumping system of this invention.

The invention also embraces a structural arrangement for thermoelectric heat pumps which enables these units to respectively absorb and dissipate heat from and to mediums in contact therewith and provides a more convenient, efficient and less expensive system of providing direct electric current to the elements of the thermoelectric system. In accordance with the invention, the thermoelectric system is housed within a container, or casing, which is movable with respect to the mediums from which heat is being absorbed and to which heat is being dissipated for the purpose of increasing the rate of heat transfer between the mediums and the thermoelectric system. A rotatable system is preferably employed and driven by a synchronous converter which is energized by alternating current and functions in the dual capacity of a motor, to rotate the thermoelectric unit, and a generator, to supply direct electric current to the thermoelectric system.

Additional features and advantages, as well as the objects of the invention, will become apparent from the following detailed description in which reference is made to the accompanying drawings wherein.

Figure 1:
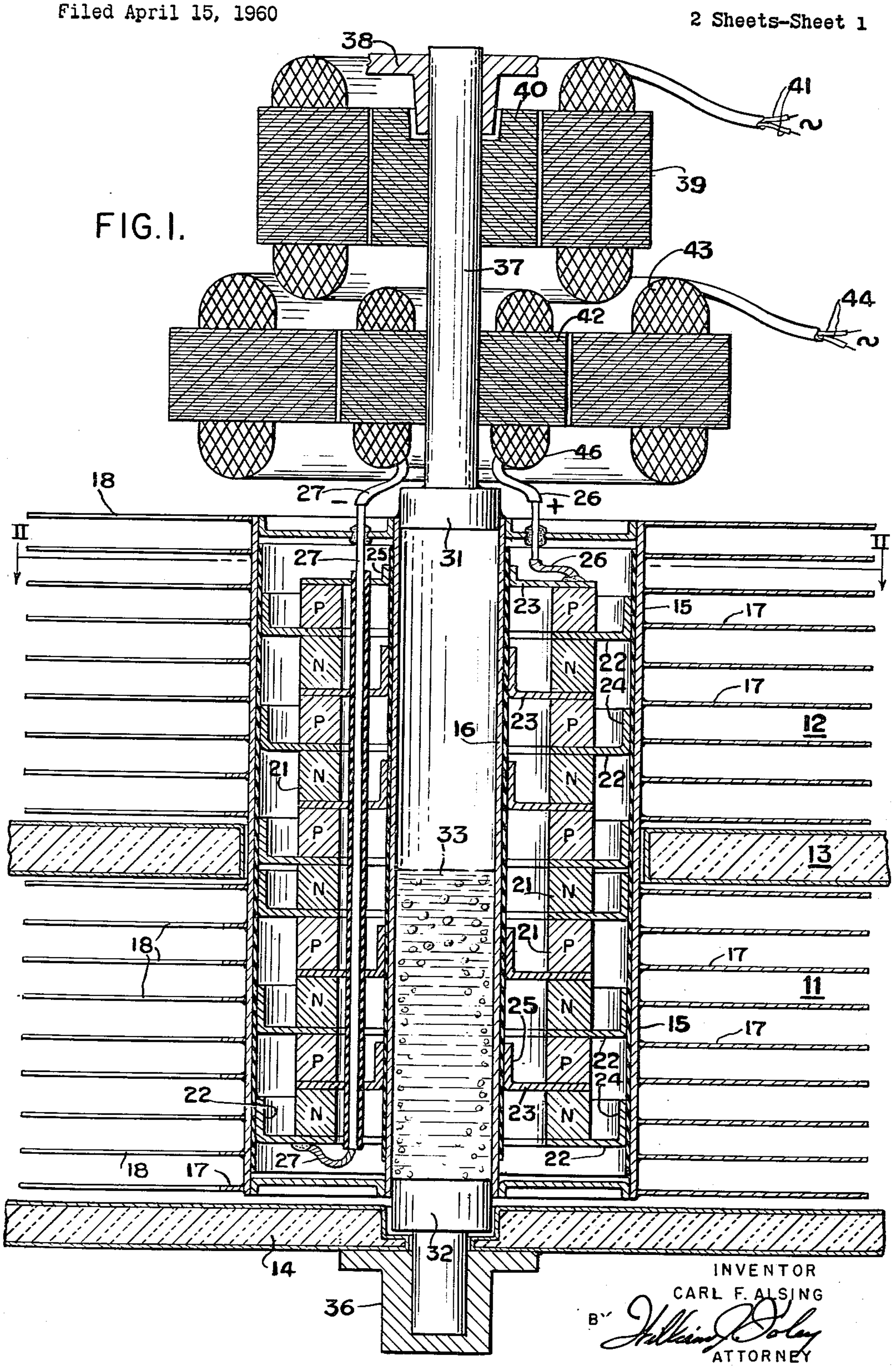
FIG. 1 is a vertical sectional view through a heat pump unit embodying this invention.
Figure 2:
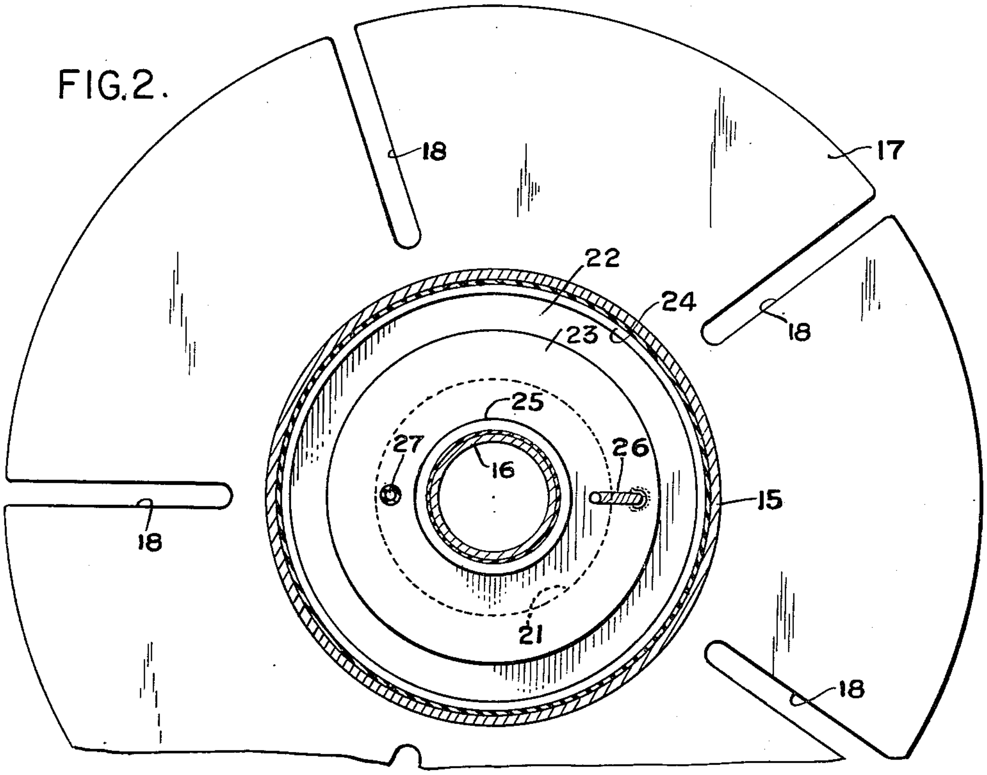
FIG. 2 is a horizontal sectional view through the heat pump unit taken as indicated generally by the line II—II in FIG. 1.
Figure 3:
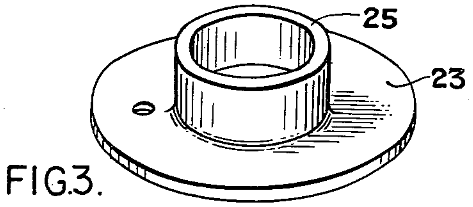
FIGS. 3 and 4 illustrate two types of junction members employed in the thermoelectric system of the heat pump for the purpose of carrying electric current and transferring heat to and from the thermoelectric elements.
Figure 5:
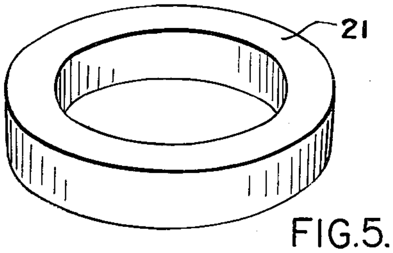
FIG. 5 is a perspective view of one of the thermoelectric elements employed in the unit.
Figure 4:
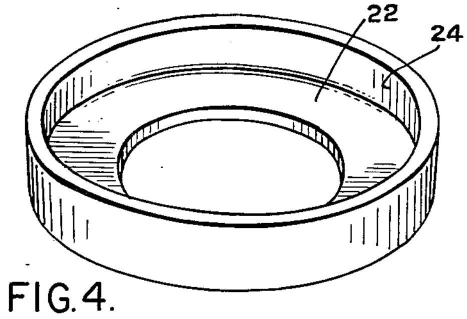

The heat pump illustrated in FIG. 1 is adapted to pump heat from one medium, such as air or other fluid, to another similar medium contained in two chambers designated 11 and 12, respectively, which are separated by a heat insulating partition 13. The chamber 11 may also be provided with additional insulated wall structure 14 for confining the medium to be cooled. The heat pumping system is contained within a cylindrical shell, or enclosure 15 disposed in concentric spaced relationship with an elongated heat transfer member 16. The shell 15 is preferably provided with extended heat transfer surfaces in the form of annular fins 17 mounted on both the upper and lower end portions thereof. The fins 17 are preferably radially slotted as indicated at 18 in FIG. 2, the purpose of which will be described later. Disposed within the space between shells 15 and heat transfer member 16 is a thermoelectric system comprising a series of thermoelectric bodies 21 formed of two materials having different thermoelectric properties. The two types of bodies 21 are alternately arranged in series, as indicated by the identifying N and P markings thereon in FIG. 1, to provide alternate hot and cold junctions therebetween. The thermoelectric bodies 21 are electrically connected and heat is conveyed to and from their junctions by a series of junction members, or conductors, which are formed to two configurations identified as 22 and 23. The junction members 22 and 23 have annular body portions thereof disposed between adjacent thermoelectric bodies 21 and are provided, respectively, with outer flanges 24 or inner flanges 25 disposed in heat transfer relationship with the heat pump shell 15 or heat transfer member 16, respectively. Electrical current is conveyed to the system of thermoelectric bodies 21 and conducting members 22 and 23 by means of two leads 26 and 27. The positive, or plus, lead 26 is connected to the uppermost conducting member 23 and the other lead 27, passes downwardly through the thermoelectric array and is connected to a lowermost conductor 22. The electrical connection is such that current passes downwardly through the series of thermoelectric bodies 21.

In accordance with the basic principles of the Peltier phenomena of heat absorption and heat dissipation at junctions between dissimilar thermoelectric bodies, heat is absorbed at a junction at which electric current is flowing from a negative body (N) to a positive body (P) and heat is dissipated, or liberated, at a junction at which electric current is flowing from a positive body to a negative body. In accordance with this invention heat is absorbed from the medium in chamber 11 through the lower portion of shell 15, is pumped into heat transfer member 16, is removed from an upper portion of the heat transfer member and dissipated through an upper portion of shell 15. Thus, in the lower portion of the shell 15 conducting members 22, having flanges 24 in heat transfer relationship with shell 15, are disposed at cold junctions between the thermoelectric bodies 21 so that heat is absorbed from this portion of the shell and conducting members 23, having flange portions 25 in heat transfer relationship with heat transfer member 16, are disposed at hot junctions between the thermoelectric bodies to convey heat from these junctions to the heat transfer member. In the upper portion of shell 15 the disposition of the conducting members 22 and 23 is reversed so that members 23 convey heat from the heat transfer member 16 to cold junctions between the thermoelectric bodies and conducting members 22 convey heat from the thermoelectric bodies to the shell 15 to be dissipated to the medium in chamber 12. The thermoelectric system functions, in effect as two thermoelectric arrays; one pumping heat into heat transfer member 16, the other pumping heat away from the heat transfer member.

The heat transfer member 16 is preferably a vertical axis, hollow cylinder formed of metal or other good heat conducting material, which is closed at its upper and lower ends by plugs 31 and 32. The plugs 31 and 32 are preferably brazed or otherwise secured in fluid-tight relationship to the cylinder of heat transfer member 16 to provide a fluid-tight enclosure for a body of volatile fluid 33. The charge of volatile fluid 33 in heat transfer member 16 is preferably in such quantity and at such pressure that the lower portion only of the interior of the heat transfer member 16 is filled with liquid phase fluid. The fluid 33 may be any of the well-known vaporizable refrigerants such as, for example, dichlorodifluoromethane or monochlorodifluoromethane.

The function of the volatile fluid 33 in heat transfer member 16 is to effectively transfer heat from the lower end of heat transfer member 16 to the upper end of this member. It can be readily appreciated that this function is fulfilled through vaporization of a portion of the liquid body of fluid 33 as heat is conveyed to the lower region of the heat transfer member and condensation of this vaporous refrigerant on the inner wall surface of member 16 in the upper region thereof, whereby the heat of condensation is carried away by the thermoelectric system in the upper portion of shell 15.

For several reasons, which will be hereinafter discussed, it is desirable that the entire heat pump unit be mounted for rotation about a vertical axis coincident with the axis of the cylindrical heat transfer member 16. To permit this rotation, the lower plug 32 of the heat transfer member 16 is journalled in a bearing 36 and the upper plug 31 is provided with a shaft-like extension 37, the upper end of which is carried in another bearing 38. The heat pump unit is rotated within bearings 36 and 38 by means of an electric motor 39 having a rotor 40 secured to the shaft extension 37 on plug 31. It is intended that the motor 39 be energized through leads 41 from an ordinary supply system of alternating electric current. The motor 39 is of a synchronous type which is adapted to turn its rotor 40 at a fixed speed as determined by the frequency of the alternating current supplied thereto.

The shaft extension 37 of the heat pump also carries at its upper end and drives a rotor 42 of a rotary converter 43. The converter 43 is supplied with alternating electric current from the same supply used for the motor 39 through a pair of leads 44. The construction of the converter 43 is such that when its rotor 42 is driven at the synchronous speed of rotation of the motor 39 direct current is induced in windings 46 carried by its rotor 42. The windings 46 are connected to leads 26 and 27 for supplying direct electric current to the thermoelectric array within shell 15. If desired, the motor 39 and the converter 43 may be combined structurally into a unitary device, commonly known as a synchronous converter, to serve the same purpose of rotating the heat pump and converting alternating current to direct current for use by the thermoelectric arrays of the heat pump. The motor and converter are shown separately in FIG. 1 to clarify the operation of the unit.

Inasmuch as the rotor 42 of the converter 43 is rotated at the same speed as the heat pump shell 15 relatively simple direct electrical connections may be provided therebetween without the necessity for slip rings or other movable electrical connections.

Rotation of the heat pump carries the additional benefit of improving the heat transfer rate between the heat pump fins 17 and the mediums in chambers 11 and 12. The fin slots 18 referred to previously assist in propelling the medium from which heat is absorbed or to which heat is dissipated over the surfaces of fins 17 and additionally improve the heat transfer rate between the fins and the mediums.

While the invention has been shown in but one form, it will be obvious to those skilled in the art that it is not so limited, but is susceptible of various other changes and modifications without departing from the spirit thereof.

What is claimed is:

1. In a thermoelectric heat pump, heat absorbing means, heat dissipating means, each of said means being movable with respect to the medium from which it absorbs heat or to which it dissipates heat for the purpose of improving the heat transfer rate, a plurality of thermoelectric elements providing hot junctions and cold junctions upon the passage of direct electric current therethrough, said elements being supported for movement with said means and having their hot junctions in heat transfer relationship with one of said means and their cold junctions in heat transfer relationship with the other of said means, a synchronous converter energized by alternating electric current, said converter having a rotor structure for moving said means and for supplying direct electric current to said thermoelectric elements, and a pair of electrical conductors carried by said rotor structure and attached to said rotor structure and to said thermoelectric elements.

2. In a thermoelectric heat pump, an elongated heat transfer member adapted to convey heat from one end thereof to the other end thereof, a casing disposed about said member in spaced relation thereto, a thermoelectric system comprising a plurality of theremoelectric elements having different thermomotive properties and being electrically connected to provide hot junctions and cold junctions, said thermoelectric system extending from a region adjacent on end of said member to a region adjacent the other end of said member, the thermoelectric elements adjacent one end of said member having their hot junctions in heat transfer relationship with a portion of said member near said one end and their cold junctions in heat transfer relationship with a corresponding portion of said casing, the thermoelectric elements adjacent the other end of said member having their cold junctions in heat transfer relationship with a portion of said member near said other end and their hot junctions in heat transfer relationship with a corresponding portion of said casing, and means for supplying direct electric current to said thermoelectric elements, whereby heat is extracted from a medium in contact with one end of said casing and dissipated to a medium in contact with the other end of said casing.

3. In a thermoelectric heat pump, an elongated heat transfer member adapted to convey heat from one end thereof to the other end thereof, means supporting said member for rotation about a longitudinal axis, a casing disposed about said member in spaced relation thereto, a plurality of thermoelectric elements disposed in the space between said member and said casing, said thermoelectric elements having different thermomotive properties and being electrically connected to provide hot junctions and cold junctions, the thermoelectric elements adjacent one end of said member having their hot junctions in heat transfer relationship with a portion of said member near said one end and their cold junctions in heat transfer relationship with a corresponding portion of said casing, the thermoelectric elements adjacent the other end of said member having their cold junctions in heat transfer relationship with a portion of said member near said other end and their hot junctions in heat transfer relationship with a corresponding portion of said casing, means for supplying direct electric current to said thermoelectric elements, whereby heat is extracted from a medium in contact with one end of said casing and dissipated to a medium in contact with the other end of said casing, and means connected to said member for rotating said member and said casing to increase the rate of heat transfer from and to said mediums.

4. In a thermoelectric heat pump, an elongated heat transfer member adapted to convey heat from one end thereof to the other end thereof, means supporting said member for rotation about a longitudinal axis, a casing disposed about said member in spaced relation thereto, a plurality of thermoelectric elements disposed in the space between said member and said casing, said thermoelectric elements having different thermomotive properties and being electrically connected to provide hot junctions and cold junctions, the thermoelectric elements adjacent one end of said member having their hot junctions in heat transfer relationship with a portion of said member near said one end and their cold junctions in heat transfer relationship with a corresponding portion of said casing, the thermoelectric elements adjacent the other end of said member having their cold junctions in heat transfer relationship with a portion of said member near said other end and their hot junctions in heat transfer relationship with a corresponding portion of said casing, whereby heat is extracted from a medium in contact with one end of said casing and dissipated to a medium in contact with the other end of said casing, a rotating, synchronous converter energized by alternating electric current and adapted to supply direct electric current to said thermoelectric elements, and means connecting said converter to said member for rotating said member and said casing to increase the rate of heat transfer from and to said mediums.

5. In a thermoelectric heat pump, an elongated heat transfer member adapted to convey heat from one end thereof to the other end thereof, means supporting said member for rotation about a longitudinal axis, a casing concentrically disposed about said member in spaced relation thereto, a plurality of thermoelectric elements disposed in the space between said member and said casing, said thermoelectric elements having different thermomotive properties and being electrically connected to provide hot junctions and cold junctions, the thermoelectric elements adjacent one end of said member having their hot junctions in heat transfer relationship with a portion of said member near said one end and their cold junctions in heat transfer relationship with a corresponding portion of said casing, the thermoelectric elements adjacent the other end of said member having their cold junctions in heat transfer relationship with a portion of said member near said other end and their hot junctions in heat transfer relationship with a corresponding portion of said casing, means for supplying direct electric current to said thermoelectric elements, whereby heat is extracted from a medium in contact with one end of said casing and dissipated to a medium in contact with the other end of said casing, first and second sets of extended surface heat transfer members on said casing adjacent the ends of said casing, respectively, and means connected to said member for rotating said member and said casing to increase the rate of heat transfer from and to said mediums.

6. In a thermoelectric heat pump, a closed container, a volatile fluid within said container, and first and second arrays of thermoelectric elements each providing hot junctions and cold junctions upon the passage of electric current therethrough, said first thermoelectric array having the hot junctions thereof in heat transfer relationship with a lower portion of said container and the cold junctions thereof in heat transfer relationship with a medium from which heat is extracted, said second thermoelectric array having the cold junctions thereof in heat transfer relationship with an upper portion of said container and the hot junctions thereof in heat transfer relationship with a medium to which heat is dissipated, the arrangement being such that heat is transferred from said first thermoelectric array to said second thermoelectric array by evaporation of said volatile fluid in a lower portion of said container and condensation of said fluid in an upper portion of said container.

7. In a thermoelectric heat pump, an upright, closed container, a volatile fluid in said container, a casing disposed about said container and extending substantially the entire length of the container, means providing extended heat transfer surfaces on the exterior of said casing, a first array of thermoelectric elements disposed between said casing and said container and having cold junctions in heat transfer relationship with a lower portion of said casing and hot junctions in heat transfer relationship with a lower portion of said container, a second array of thermoelectric elements disposed between said casing and said container and having cold junctions in heat transfer relationship with an upper portion of said container and hot junctions in heat transfer relationship with an upper portion of said casing, means for rotating said casing to increase the heat transfer rate between said surfaces and the mediums from which heat is extracted and to which heat is dissipated, and means for supplying electric current to said arrays of thermoelectric elements.

8. In a thermoelectric heat pump, an upright closed container, a volatile fluid in said container, a first array of thermoelectric elements having cold junctions in heat transfer relationship with a medium from which heat is to be extracted and hot junctions in heat transfer relationship with a lower portion of said container, a second array of thermoelectric elements having cold junctions in heat transfer relationship with an upper portion of said container and hot junctions in heat transfer relationship with a medium into which heat is to be dissipated, a rotary synchronous converter adapted to be energized by alternating electric current, means connecting said converter to said container for rotating said container and said arrays to increase the heat transfer rate between said arrays and the mediums from which heat is extracted and to which heat is dissipated, and means electrically connecting said converter to said arrays of thermoelectric elements, whereby said converter energizes said thermoelectric arrays with direct electric current.

9. In a thermoelectric heat pump, an upright closed container, a volatile fluid in said container, a casing disposed about said container and extending substantially the entire length of the container, means providing extended heat transfer surfaces on the exterior of said casing, a first array of thermoelectric elements having cold junctions in heat transfer relationship with a lower portion of said casing and hot junctions in heat transfer relationship with a lower portion of said container, a second array of thermoelectric elements having cold junctions in heat transfer relationship with an upper portion of said container and hot junctions in heat transfer relationship with an upper portion of said casing, a rotary synchronous converter adapted to be energized by alternating electric current, means connecting said converter to said casing for rotating said casing to increase the heat transfer rate between said surfaces and the mediums from which heat is extracted and to which heat is dissipated, and means electrically connecting said converter to said arrays of thermoelectric elements, whereby said converter energizes said thermoelectric arrays with direct electric current.

References Cited in the file of this patent

UNITED STATES PATENTS

| | | |
|---|---|---|
| 664,776 | Porter | Dec. 25, 1900 |
| 1,120,781 | Altenkirch | Dec. 15, 1914 |